Sept. 25, 1956 R. A. MUSCHAMP 2,764,641
COMPENSATED AMPLIFYING SYSTEM
Filed Oct. 15, 1952
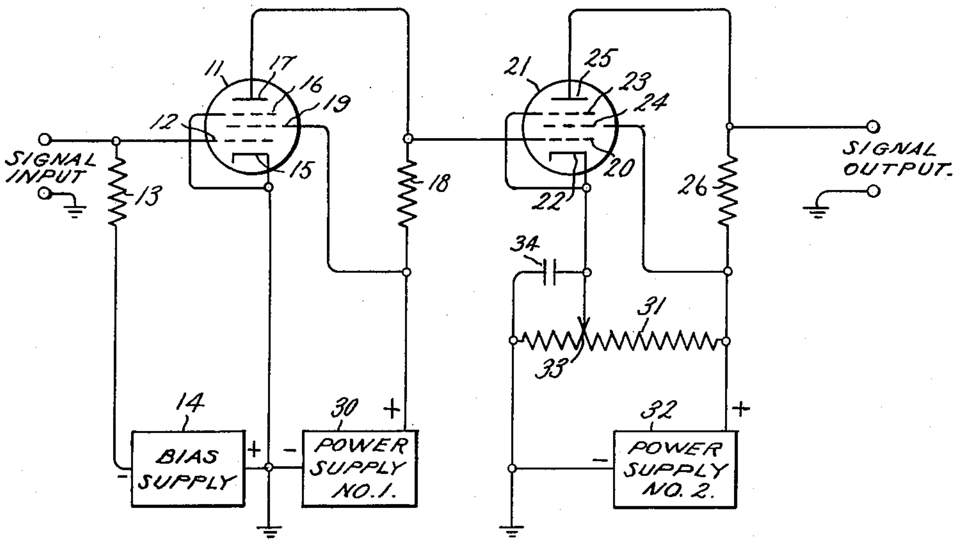
Inventor:
Robert A. Muschamp,
by Merton D. Morse
His Attorney.

Patented Sept. 25, 1956

2,764,641

COMPENSATED AMPLIFYING SYSTEM

Robert A. Muschamp, North Syracuse, N. Y., assignor to General Electric Company, a corporation of New York Application October 15, 1952, Serial No. 314,773

4 Claims. (Cl. 179—171)

The present invention relates to compensated amplifying systems and, more particularly, to improved means for compensating for the effects of variations in the source voltage. The invention has particular utility in direct-coupled amplifying systems and has specific application in systems of this type as applied to video amplifying systems for television receiving apparatus and the like.

Amplifying systems of the type comprising successive stages of amplification directly-connected in cascade circuit relation are particularly susceptible to undesirable fluctuations in plate current due to variations in the operating potentials. This is because variations in the plate voltage of the next preceding stage, even those variations occurring at a relatively slow rate, are readily transmitted by the direct connection to the control grid of the next following stage, and are therefore amplified along with the desired signals.

Direct-connected amplifiers of this type are sometimes used to drive the picture tube in the video system of a television receiving apparatus. In such case, variations in the source voltage cause undesirable changes in the brightness of the image on the television picture screen.

Various types of balancing and compensating systems, often elaborate in nature, have been devised in efforts to remedy this situation. One such system, well-known to those skilled in the art, employs pairs of vacuum tubes in a push-pull circuit. The signal is applied in opposite polarity simultaneously to the control grids of a separate tube of each pair, while the direct current operating potentials are applied in the same polarity to corresponding electrodes of both tubes in each pair. A difficulty inherent in the push-pull type of compensation system is that both vacuum tubes of each pair must be identical if variations in the operating potential are to be successfully balanced out.

Another well-known method of compensation, often used in combination with the push-pull type of compensation system, is by the use of a feedback circuit to neutralize plate current fluctuations produced by plate voltage instability. Feedback circuits, however, tend to reduce the efficiency of the amplifying system to an undesirable extent.

It is an object of the present invention to provide an improved amplifier circuit in which compensation is provided to neutralize plate voltage fluctuation due to source voltage variation.

It is another object of the present invention to provide an improved direct-coupled amplifying system that exhibits improved stability despite fluctuations of the source of operating potential.

It is still another object of the present invention to provide an improved direct-coupled amplifier circuit that is particularly suitable for use in the video amplifier systems of television receiving apparatus and the like and that is capable of neutralizing fluctuations in the image brightness on the television viewing screen produced by variations in the operating voltages.

It is a further object of the present invention to provide an improved direct-coupled amplifying system in which a pair of direct-coupled amplifiers are supplied by separate sources of operating potential that exhibit improved stability despite fluctuations of the source of operating potential that supplies the first of the pair of direct-coupled amplifiers.

Briefly stated, according to one aspect of the present invention, there is provided an amplifier circuit comprising an electron discharge device having a plurality of electrodes including an anode, a cathode, a screen grid and a control grid. The anode is supplied with operating potential through a load impedance element whose value in ohms is the reciprocal of the value in mhos of the screen-to-anode transconductance of the device.

For additional objects and advantages, and for a better understanding of the invention, attention is now directed to the following description and accompanying drawing. The features of the invention which are believed to be novel are particularly pointed out in the appended claims.

The single figure of the drawing is a schematic diagram of a direct-coupled amplifier circuit embodying the present invention.

Referring now to the figure, there is shown an electron discharge device 11, preferably of the pentode type as shown, including a cathode 15, a control grid 12, a screen grid 19, a suppressor grid 16 and an anode 17. The control grid 12 is connected through a grid dropping resistor 13 to the negative terminal of a bias supply 14 having its positive terminal grounded. The suppressor grid 16 is connected directly to the cathode 15 in well-known manner. The cathode 15 is connected to common ground. The anode 17 of device 11 is connected through a load resistor 18 to the positive side of a first source of operating potential 30 having its negative side connected to common ground. Screen grid 19 is also connected to the positive side of the first source 30. Although for simplicity the bias supply 14 is shown in the drawing as a separate source, the bias voltage for the grid 12 may conveniently be provided in other conventional manner, e. g., by connection to a suitable output terminal on the first source 30. In such case, it is of course understood that the bias terminal must be of negative potential with respect to the cathode 15.

The anode 17 of device 11 is connected directly to the control grid 20 of a second electron discharge device 21. Device 21 may be any conventional amplifier and, for example, may be of the pentode type as shown, having a control grid 20, a screen grid 24, and a suppressor grid 23, in addition to its anode 25 and cathode 22. The cathode 22 of device 21 is connected to a tap 33 on a voltage-dividing resistor 31. Resistor 31 is connected across a second source of operating potential 32 having its negative terminal connected to ground. The second source 32 may be any conventional source of direct voltage suitable for supplying potentials of suitable value for the device 21. Tap 33 is located at a suitable distance from ground in order to provide correct negative bias on the grid 20 with respect to the cathode 22. A by-pass capacitor 34 is provided from cathode 22 to ground in order to eliminate degeneration of the signal voltage across the portion of resistor 31 between tap 33 and ground. The suppressor grid 23 is directly connected to the cathode 22. The screen grid 24 is connected to the positive terminal of the second source 32. The anode 25 of device 21 is connected through a load resistor 26 to the positive terminal of the second source 32. A signal output tap, designated as such, is provided between anode 25 and resistor 26 in order to provide means for deriving an output signal with respect to ground.

The operation of the foregoing circuit follows conventional amplifier principles of operation. When a signal voltage with respect to ground is applied to the control grid 12 of device 11, the flow of current in the plate circuit in device 11 is controlled thereby in well-known manner. The load resistor 18 functions as an interstage coupling element between device 11 and device 21. The voltage drop across load resistor 18 varies as the flow of plate current in device 11. Variations in the voltage drop across resistor 18 are thereby applied directly to the control grid 20 of device 21 to control the plate current of that device and produce an output voltage with respect to ground across the load-resistor 26 in the usual manner. The output voltage appearing across resistor 26 may be employed to energize any conventional electro-sensitive apparatus (not shown) such as the control electrode of another stage of amplification, or a loudspeaker device in the case of an audio frequency sound system, or the control electrode of a cathode-ray tube of the type employed as the picture tube of a television receiving apparatus or the like.

Apart from the compensating effect of the present invention as described below, variations in the voltage of the first source 30 produce a corresponding variation in the plate voltage of device 11. And in accordance with the normal operation of the illustrated direct-coupled circuit, variations in the plate voltage of device 11 will be transmitted by the direct connection from the anode 17 of device 11 to the control grid 20 of device 21 where it will be amplified along with the signal. Thus, in order to provide a stable output from device 21 it is essential that the plate voltage of device 11 be stabilized.

In accordance with the present invention, it has been found that by the proper selection of the value of resistor 18 with respect to the screen grid-to-anode transconductance of device 11 variations in the voltage of the first source 30 which would otherwise cause variations in the voltage of anode 17 may effectively be neutralized. Specifically, the requirement for neutralization is that the value in ohms of resistor 18 be the reciprocal of the value in mhos of the screen grid-to-anode transconductance of the device 11.

It is believed that the effective neutralization of the effect of source voltage variation on the plate voltage of device 11 provided by the present invention is due to the equalization of two opposing forces. These forces are, first, the direct effect on the plate voltage produced by source voltage variation and, secondly, the effect of source voltage variations on the screen grid voltage causing a variation in plate current which in turn produces a voltage drop across load resistor 18.

Apart from any change in the flow of plate current in device 11, if the voltage of the source 30 increases, the plate voltage of device 11 likewise increases. Conversely, the plate voltage of device 11 decreases with a decrease in source voltage. Thus, the plate voltage of device 11 tends to follow along directly with variations in the voltage of the source 30. However, if current flows through the load resistor 18 there will be a voltage drop across resistor 18 which will tend to lower the voltage of the anode 17. The converse is also true in this case.

As is well known, the plate current flowing in device 11 is determined by the screen grid voltage independently of its anode voltage and since the screen grid 19 of device 11 is connected directly to the source of operating potential 30, any change in the source voltage will produce a similar change in the voltage of screen grid 19. The relationship between the change in plate current that is caused by a change in the screen grid voltage is known as the screen grid-to-anode transconductance of the electron discharge device.

Now let us consider the effect of a change of source voltage on the plate voltage of device 11. If, for example, the source voltage increases, the plate voltage, apart from other considerations, will tend to increase directly with the source voltage. However, as the source voltage increases the screen grid increases in voltage which produces a change in the plate current that is dependent upon the transconductance of the device used. The plate current follows directly changes in the screen grid voltage. Thus, as the screen grid voltage increases, the plate current increases. However, as the plate current increases there will be a drop in voltage across the load resistor 18 which will tend to cause a decrease in the plate voltage. By arranging the circuit parameters so that the voltage drop across resistor 18 just equals the increase in the source voltage, the voltage of the plate 17 will be unaffected by source voltage variations. In order to accomplish this result, it is necessary to provide a gain of unity from screen grid-to-plate and since the gain from screen grid to plate is equal to the product of the screen grid-to-plate transconductance times the load resistance 18, it is necessary that the product of the screen grid-to-anode transconductance of device 11 times the resistance in ohms of the load impedance 18 be equal to one (1).

As a practical matter, the load resistance or impedance 18 should be chosen from other circuit considerations such as frequency response and then a discharge device should be selected whose screen-to-plate transconductance satisfies the desired relationship described above.

While the present invention has been described with specific reference to a resistance element as the amplifier load, and more specifically, as the common coupling element of two direct-coupled stages, it is to be understood that this element in some cases may comprise other convenient forms of impedance, such as an inductance element, for instance. In most cases, however, the load element is preferably, at least primarily, a resistance element, as shown, in order most effectively to provide for neutralization of those source voltage fluctuations which occur at a relatively slow rate. It is also to be understood that although the present invention finds a useful application in direct-coupled amplifier systems, its useful features have desirable application in circuits of other types where plate voltage stability is an important consideration.

The present invention has been illustrated with a direct-coupled amplifier system in which separate power supplies have been provided for each of the two amplifier stages. This is not to be considered a necessary part of the present invention and it has been done merely to illustrate a particular application of the invention. This application is considered a practical one to illustrate the advantages of the invention by showing an application in which other circuit elements may be connected to the first power supply 30, thus causing its output voltage to fluctuate in an undesirable manner. The second power supply 32 may be a high voltage type of supply which may be more or less stable than the first power supply 30; however, its variations will have little or no effect upon the plate voltage of device 11.

Thus, by a proper selection of parameters for the load impedance and the screen grid-to-anode transconductance of an electron discharge device, the effect of source voltage variation on its anode voltage may be effectively eliminated; and, as mentioned above, the condition for equilibrium has been found to require that the value in ohms Z of the load impedance element of the amplifier be equal to the reciprocal of the value in mohs Sg of the screen grid-to-anode transconductance of the electron discharge device. Or, expressing the relationship in another manner, equilibrium exists when $Z \times Sg = 1$. This equation becomes $R \times Sg = 1$ where the load impedance element consists of pure resistance R as in the illustration shown in the figure.

It is believed to be apparent from the foregoing disclosure that the present invention provides an improved amplifier circuit having improved plate current stability in view of source voltage fluctuations. This feature of improved plate current stability makes the circuit particularly suitable for use in direct-coupled amplifying systems, and it has particular application as a video amplifier for providing picture images of improved brightness stability in television receiving apparatus.

While a specific embodiment has been shown and described, it will, of course, be understood that various modifications may be made without departing from the principles of the invention. The appended claims are therefore intended to cover any such modifications within the true spirit and scope of the invention.

What I claim as new and desire to secure by Letters Patent of the United States is:

1. In a direct-coupled cascade amplifier circuit, a first electron discharge device having a plurality of electrodes including an anode, a cathode, a control grid, and a screen grid, means for applying an input signal to said control grid, a second electron discharge device having a plurality of electrodes including an anode, a cathode, and a control grid, a coupling resistance element in series with the anode-to-cathode path of said first device and with the control grid-to-cathode path of said second device and connected between said anode and said screen grid of said first electron discharge device, means for applying suitable operating potentials from a source to the electrodes of said devices including a connection from said source to the junction of said resistance and said screen grid of said first electron discharge device, said circuit substantially satisfying the equation $R \times Sg = 1$, where R represents the value in ohms of said resistance element and Sg represents the screen grid-to-anode mutual conductance in mhos of said first device.

2. In a direct-coupled cascade amplifier circuit, a first electron discharge device having a plurality of electrodes including an anode, a cathode, a control grid, and a screen grid, a second electron discharge device having a plurality of electrodes including an anode, a cathode, and a control grid, a coupling impedance element in series with the anode-to-cathode path of said first device and with the control grid-to-cathode path of said second device and connected between said anode and said screen grid of said first electron discharge device, means for applying suitable operating potentials from a source to the electrodes of said devices including a connection from said source to the junction of said impedance element and said screen grid of said first electron discharge device, said circuit substantially satisfying the equation $Z \times Sg = 1$, where Z represents the value in ohms of said impedance element and Sg represents the screen grid-to-anode mutual conductance in mhos of said first device.

3. An amplifier comprising in combination an electron discharge device having a cathode, a control grid, a screen grid and an anode, an input circuit coupled to said control grid, an impedance element connected between said anode and said screen grid, said impedance element having a value in ohms equal to the reciprocal of the value in mhos of said screen grid-to-anode transconductance, a source of operating potential having positive and negative terminals, a connection between said positive terminal and the junction of said screen grid and said impedance element, a connection between said negative terminal and said cathode, an output connection to said anode.

4. An amplifier comprising in combination an electron discharge device having a cathode, a control grid, a screen grid and an anode, an input circuit coupled to said control grid, an impedance element connected between said anode and said screen grid, said impedance element having a value in ohms equal to the reciprocal of the value in mhos of said screen grid-to-anode transconductance, a source of operating potential having positive and negative terminals, a connection between said positive terminal and the junction of said screen grid and said impedance element, a connection between said negative terminal and said cathode, a second electron discharge device having at least an anode, cathode and control grid, a source of operating potential coupled to said second electron discharge device, a direct currrent connection between said latter control grid and said anode of said first electron discharge device and an output circuit coupled to said second electron discharge device.

References Cited in the file of this patent

UNITED STATES PATENTS

| | | |
|---|---|---|
| 1,936,597 | Gunn | Nov. 28, 1933 |
| 1,951,251 | McDonald | Mar. 13, 1934 |
| 2,095,261 | McCaa | Oct. 12, 1937 |
| 2,239,362 | Gilbert | Apr. 22, 1941 |
| 2,354,718 | Tuttle | Aug. 1, 1944 |
| 2,423,671 | Wolff | July 8, 1947 |
| 2,511,122 | Newby | June 13, 1950 |
| 2,523,468 | Hare | Sept. 26, 1950 |